(12) United States Patent
Minami et al.

(10) Patent No.: US 7,001,080 B2
(45) Date of Patent: Feb. 21, 2006

(54) END FACE POLISHING METHOD

(75) Inventors: Kouji Minami, Chiba (JP); Junji Taira, Chiba (JP)

(73) Assignee: Seikoh Giken Co., Ltd., Matsudo (JP)

( * ) Notice: Subject to any disclaimer, the term of this patent is extended or adjusted under 35 U.S.C. 154(b) by 129 days.

(21) Appl. No.: 10/323,374

(22) Filed: Dec. 19, 2002

(65) Prior Publication Data
US 2003/0147599 A1 Aug. 7, 2003

(30) Foreign Application Priority Data
Dec. 28, 2001 (JP) .............................. 2001-401265

(51) Int. Cl.
*G02B 6/36* (2006.01)
*B24B 19/22* (2006.01)

(52) U.S. Cl. ........................... 385/85; 451/41; 451/51; 451/66; 65/61

(58) Field of Classification Search .................. 385/85, 385/134, 147; 65/61; 451/28, 41, 51, 66
See application file for complete search history.

(56) References Cited

U.S. PATENT DOCUMENTS

| | | | | |
|---|---|---|---|---|
| 5,216,846 A | * | 6/1993 | Takahashi | 451/57 |
| 5,480,344 A | * | 1/1996 | Xu et al. | 451/28 |
| 5,547,418 A | * | 8/1996 | Takahashi | 451/278 |
| 5,556,323 A | * | 9/1996 | Luther et al. | 451/28 |
| 5,909,530 A | * | 6/1999 | Ohkubo et al. | 385/147 |
| 6,113,469 A | * | 9/2000 | Yoshikawa et al. | 451/41 |
| 6,309,278 B1 | * | 10/2001 | Suzuki et al. | 451/41 |
| 6,565,423 B1 | * | 5/2003 | Matsunaga et al. | 451/270 |
| 2001/0041512 A1 | * | 11/2001 | Kato et al. | 451/41 |
| 2002/0159718 A1 | * | 10/2002 | Boyer et al. | 385/85 |

FOREIGN PATENT DOCUMENTS

EP 951962 A1 * 10/1999

* cited by examiner

*Primary Examiner*—Akm Enayet Ullah
*Assistant Examiner*—Daniel Petkovsek
(74) *Attorney, Agent, or Firm*—Adams & Wilks

(57) ABSTRACT

An end face polishing method provides an end face polishing apparatus having a main body, a jig board mounted on the main body and supporting at least one workpiece, a polishing board mounted on the main body for undergoing rotational and revolving movements relative to the main body, and abrasive members each removably connectable to the polishing board for rotational and revolving movements therewith. Each of the abrasive members has an abrasive surface with a hardness that is either higher or lower than the hardness of the abrasive surface of the others of the abrasive members. An end face of a workpiece is successively brought into pressure contact with the abrasive surface of each of the abrasive members in descending order of hardness of the abrasive surfaces while rotating and revolving the polishing board to thereby successively polish the end face of the workpiece.

20 Claims, 6 Drawing Sheets

END FACE POLISHING METHOD

BACKGROUND OF THE INVENTION

1. Field of the Invention

The present invention relates to an end face polishing method for polishing an end face of a workpiece in the form of, for example, a rod-shaped member such as a fiber for optical communication or a ferrule in which the fiber for optical communication is held.

2. Description of the Related Art

The fiber for optical communication is used by polishing simultaneously and smoothly the end face of the ferrule and the end face of the fiber to be a mirror surface after the fiber is fixedly adhered to an inside of a center hole of the ferrule which is a main member of a connector. When polished surfaces of the polishing finished ferrule and fiber are not perpendicular to a central axis of the ferrule or there is a flaw on the polished surface, accuracy of facing position is deteriorated and loss is increased in the optical connector in which the ferrules are oppositely connected each other. Therefore, the polishing finish of the high accuracy is required for the polished surface of the ferrule including the optical fiber.

For example, in JA-A-3-26456, there is disclosed an optical fiber end face polishing apparatus of the related art for polishing the end face of the ferrule including the optical fiber. The optical fiber end face polishing apparatus disclosed in the publication has an eccentric board which rotates on a concentric circle of a rotation disk and a planetary gear which transmits a rotation of a motor for a revolution to the eccentric board, connects them with a polishing board to rotate and revolve the polishing board, and polishes the end faces of a number of ferrules which are held to a jig board by a support portion provided in a main body of the apparatus while the end faces of the ferrules are pressed to an abrasive member fixed to the polishing board.

In case that the end face of the ferrule is polished by using the above-described optical fiber end face polishing apparatus, generally, there is employed an optical fiber end face polishing method in which, in order, a rough polishing process is carried out by using the abrasive member having given hardness, an intermediate polishing process is carried out by using the abrasive member having the hardness higher than the abrasive member used for the rough polishing process, and then a final polishing process is carried out by using the abrasive member having the hardness higher than the abrasive member used for the intermediate polishing process.

In the optical fiber end face polishing method, since the end face of the ferrule is polished by the abrasive member which is fixed to the rotated or revolved polishing board, for example, by rough-polishing the end face of the ferrule in the rough polishing process, a peripheral portion of a radial outside in the end face of the ferrule is gradually rough-polished and the end face of the ferrule is formed to be a convex sphere.

After the rough polishing process, the intermediate polishing process and the final polishing process are carried out in order, and in these cases, the polishing is carried out in a manner that the abrasive member used in the immediately previous polishing process is changed for the abrasive member having the hardness higher than the abrasive member used in the immediately previous polishing process. That is to say, the end face of the ferrule is polished in a manner that the final polishing process is carried out with the abrasive member having the hardness higher than the abrasive member used for the intermediate polishing process after the intermediate polishing process is carried out with the abrasive member having the hardness higher than the abrasive member used for the rough polishing process. This allowed the mirror surface finish to be carried out in such a manner that, in a neighborhood of the end face of the optical fiber in the end face of the ferrule, the end face of the ferrule in the shape of the convex sphere is gradually polished to be smooth.

However, in the above-described optical fiber end face polishing apparatus, since the end face of the ferrule is polished under pressure to the abrasive member with a given load while the abrasive members are changed in the order from those of the lower hardness to those of the higher hardness in each of the polishing processes, in the intermediate and final polishing processes after a nearly central portion of the end face of the ferrule is formed to be the convex in the first rough polishing process, polishing pressure against the end face of the ferrule is gradually decreased in a radially outward direction. That is to say, in the intermediate and final polishing processes, when the end face of the ferrule is polished under pressure, a change in an elastic deformation of the abrasive member is decreased compared with the rough polishing process, an area where the end face of the ferrule abuts on the abrasive member is gradually decreased toward the direction of the end face of the optical fiber. Therefore, there is a problem that the polishing pressure applied to the neighborhood of the end face of the optical fiber in the end face of the ferrule is increased, the peripheral portion of the radial outside in the end face of the ferrule is not polished in the intermediate and final polishing processes, consequently, a polishing residue of the rough polishing process is generated.

For example, when the ferrule in which the polishing residue has been generated is oppositely connected to an optical connector adaptor, there is a problem that the peripheral portion of the end face of the ferrule contacts an inside surface of a sleeve, which causes the flaw to be generated in the inside surface of the sleeve.

Since the polishing pressure applied to the nearly central portion of the end face of the ferrule is increased with proceeding from the rough polishing process to the subsequent polishing processes, there are a problems that the neighborhood of or region near the end face of the optical fiber in the end face of the ferrule is concaved by being excessively polished or that a scratch is generated in the end face in case that some foreign matter enters between the end face of the ferrule and the polishing surface of the polishing member.

Furthermore, though abrasive particles which polish the end face of the ferrule intervene on the polishing surface of the polishing member, when the polishing pressure applied to the neighborhood of the end face of the optical fiber in the end face of the ferrule is large, a damaged layer is generated in the end face of the ferrule by an influence of the abrasive particle. This causes a problem that return loss is decreased when the ferrules are oppositely connected each other.

SUMMARY OF THE INVENTION

In view of the foregoing, it is an object of the invention to provide an end face polishing method in which polishing accuracy of the end face of the ferrule is improved and the return loss is increased in opposite connection.

A first aspect of the invention for solving the above-described problems is an end face polishing method in which a rod-shape member is polished by pressing the rod-shaped member attached to a jig board against an abrasive member on a polishing board which is supported by a main body of an apparatus to be rotated and oscillated, which is characterized in that the end face of the rod-shaped member is polished by using a plurality of abrasive members each having a different hardness, in a manner that the abrasive member is changed from that of a higher hardness to that of a lower hardness.

A second aspect of the invention is characterized in that, in the first aspect, the rod-shaped member is pressed with a constant load while the rod-shaped member is supported at a given position with respect to the abrasive member.

A third aspect of the invention is characterized in that, in the first or second aspect, the plurality of the abrasive members comprise a rough abrasive member having given hardness, an intermediate abrasive member having the hardness lower than the rough abrasive member, and a final abrasive member having the hardness lower than the intermediate abrasive member.

A fourth aspect of the invention is characterized in that, in any one of the first to third aspects, the abrasive member comprises an elastic member fixed on the polishing board and an abrasive sheet placed on an upper surface of the elastic member.

A fifth aspect of the invention is characterized in that, in any one of the first to fourth aspects, the rod-shaped member is a ferrule in which an optical fiber is held or an optical connector holding the ferrule.

BRIEF DESCRIPTION OF THE DRAWINGS

FIG. 5 is a distribution view showing a frequency of each concave quantity according to a first Test Example of the invention, where FIG. 6 is a distribution view showing a frequency of each return loss according to a second Test Example of the invention, where

DETAILED DESCRIPTION OF THE PREFFERRED EMBODIMENTS

Embodiments of the invention will be described in detail referring to the accompanying drawings.

(First Embodiment)

Figure 1:
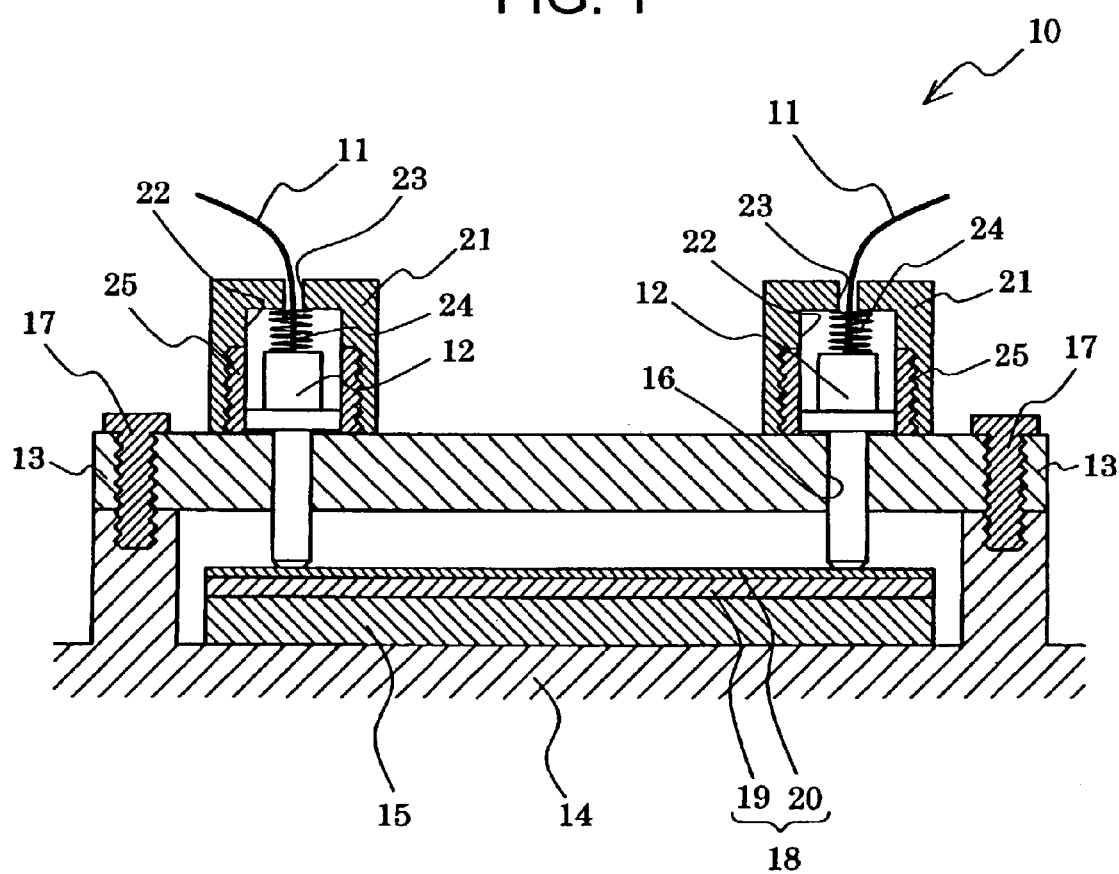
FIG. 1 is a partially sectional view of an end face polishing apparatus according to a first embodiment of the invention.

FIG. 1 is a partially sectional view of an end face polishing apparatus according to a first embodiment of the invention.

As shown in FIG. 1, an end face polishing apparatus 10 comprises a jig board 13 in which a workpiece, such as ferrule 12 holding an optical fiber 11, is fixed at a plurality of places, a main body 14 of the apparatus to which the jig board 13 is fixed, and a polishing board 15 which is provided below the jig board 13 and in the main body 14 of the apparatus so as to be rotated and oscillated.

The jig board 13 has a plurality of through holes 16 which the ferrule 12 can be inserted, and the jig board 3 is fixed to the main body 14 of the apparatus by screws 17 for fastening the jig.

An abrasive member 18 polishing the end face of the ferrule 12 is detachably mounted on an upper surface portion of the polishing board 15. The abrasive member 18 includes an elastic member 19 fixed on the polishing board 15 and an abrasive sheet 20 placed on an upper surface of the elastic member 19.

The abrasive member 18, though described in more detail below, comprises a rough polishing member having a rough polishing sheet of given polishing roughness on an elastic member for the rough polishing of given hardness, an intermediate polishing member having an intermediate polishing sheet of the polishing roughness larger than the rough polishing sheet on an elastic member for the intermediate polishing of the hardness lower than the elastic member for the rough polishing, and a final polishing member having a final polishing sheet of the polishing roughness larger than the intermediate polishing sheet on an elastic member for the final polishing of the hardness lower than the elastic member for the intermediate polishing.

A material used for the elastic member 19 is not particularly limited, so long as the material can be properly adjusted to the given hardness, and rubber, elastomer, resin and the like are taken as an example.

The abrasive sheet 20 comprises an abrasive grain (not shown) including, for example, diamond, silicon oxide, cerium oxide, silicon nitride or the like, and the abrasive sheet 20 is adhered to an upper surface of the elastic member 19.

The jig board 13 comprises a holding member 21 which presses the end face of the ferrule 12 to the polishing surface of the abrasive member 18 with a constant load, while an edge portion of the ferrule 12 is inserted into the through hole 16 and the end face of the ferrule 12 abuts an upper surface of the abrasive member 18.

The holding member 21 is provided with a holding hole 22 which holds the ferrule 12 and a through hole for inserting 23 which communicates with the holding hole 22 and allows the optical fiber 11 held by the ferrule 12 to insert through.

An adjusting spring 24 for pressing the end face of the ferrule 12 to the polishing surface of the abrasive member 18 with the constant load and an adjusting spring 25 for adjusting the load are fitted inside the holding hole 22.

As described above, the end face of the ferrule 12 pressed to the upper surface of the abrasive member 18 with the constant load is polished by rotating or revolving the polishing board 15, and at this point, polishing is carried out in a manner that the abrasive member is changed in order from that of higher hardness to that of lower hardness in each of the rough polishing process, the intermediate polishing process, and the final polishing process.

The end face polishing method of the embodiment will be described in detail referring to FIG. 2 to FIG. 4. FIG. 2 to FIG. 4 are schematically sectional views illustrating each polishing process of the end face polishing method according to the first embodiment of the invention.

Figure 2A:
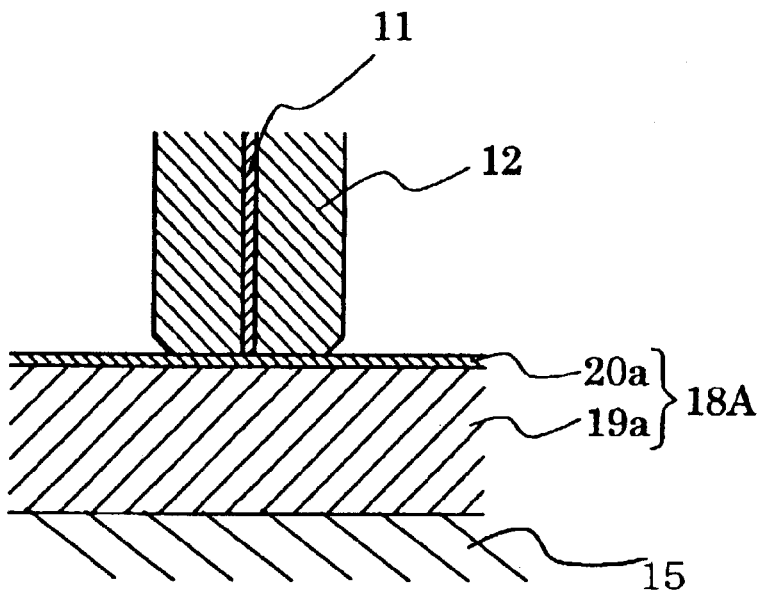
FIG. 2 is a schematically sectional view illustrating a rough polishing process of an end face polishing method according to the first embodiment of the invention.

As shown in FIG. 2A, in the rough polishing process, the end face of the ferrule 12 including the optical fiber is rough-polished while the end face of the ferrule 12 is pressed with the constant load against a surface of a rough polishing sheet 20a on an elastic member for rough polishing 19a of a given hardness, which is fixed on the polishing board 15. At this point, by pressing the end face of the ferrule 12 with the constant load, a rough abrasive member 18A including the polishing sheet 20a and elastic member 19a is elastically deformed in a thickness direction and a portion where the end face of the ferrule 12 is pressed is concaved a given amount.

Figure 2B:
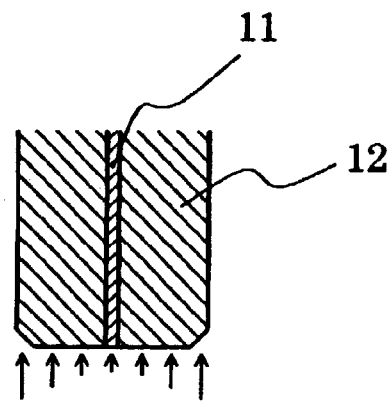
Figure 2C:
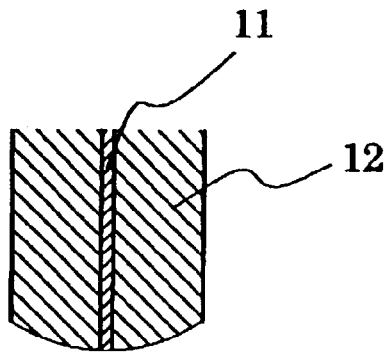

Therafter, while the end face of the ferrule 12 is pressed against the upper surface of the rough abrasive member 18A, the end face of the ferrule 12 is rough-polished by rotating or revolving the polishing board 15. In this case, as shown in FIG. 2B, the polishing pressure applied to the end face of the ferrule 12 is gradually increased from the nearly central portion of the end face of the ferrule 12 toward the radial outside. Thus, as shown is FIG. 2C, the peripheral portion of the radial outside in the end face of the ferrule 12 is rough-polished, and the end face of the ferrule 12 is formed into a convex sphere.

Figure 3A:
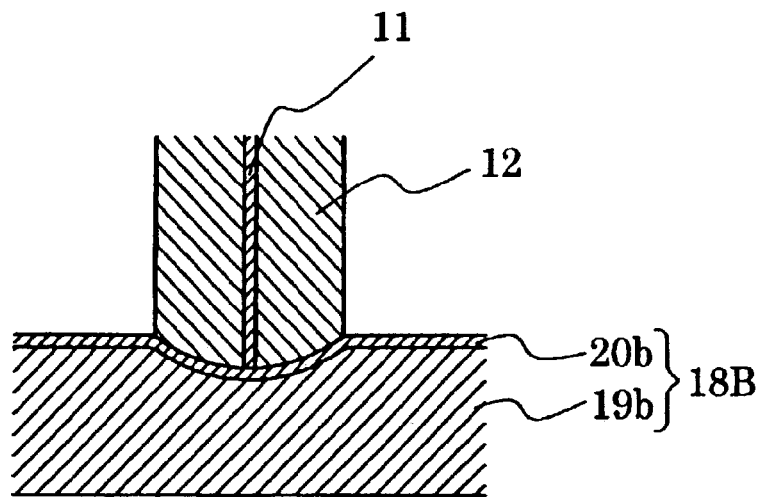
FIG. 3 is a schematically sectional view illustrating an intermediate polishing process of the end face polishing method according to the first embodiment of the invention.

As shown in FIG. 3A, in the intermediate polishing process, at first the elastic member for the rough polishing 19a used in the rough polishing process is changed for an elastic member for the intermediate polishing 19b of the hardness lower than the elastic member for the rough polishing 19a, then, in the same way as the rough polishing process, the end face of the ferrule 12 which has been formed to be the convex sphere by the rough polishing is polished while the end face of the ferrule 12 is pressed with the constant load to a surface of an intermediate polishing sheet 20b adhered on the elastic member for the intermediate polishing 19b. At this point, since the polishing is carried out with the constant load by changing the elastic member for the rough polishing 19a for the elastic member for the intermediate polishing 19b of the hardness lower than the elastic member for the rough polishing 19a in the intermediate polishing process, the amount of the elastic deformation of an intermediate abrasive member 18B is increased compared with the rough polishing.

Figure 3B:
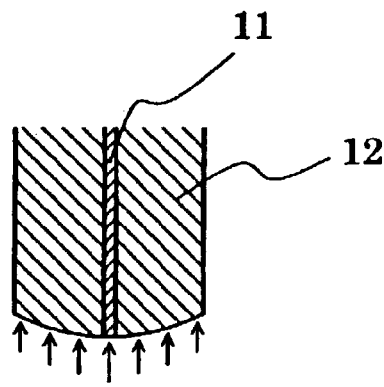
Figure 3C:
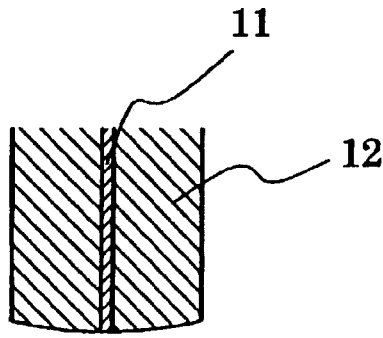

Consequently, as shown in FIG. 3B, a pressure distribution of the polishing pressure applied to the end face of the ferrule 12 can be concentrically and nearly uniformly dispersed to a whole area of the end face of the ferrule 12 without concentrating the pressure distribution of the polishing pressure on the neighborhood of the end face of the optical fiber 11. As shown in FIG. 3C, therefore, while the neighborhood of the end face of the optical fiber 11 in the end face of the ferrule 12 is polished, the peripheral portion of the radial outside in the end face of the ferrule 12 can also be polished.

Figure 4A:
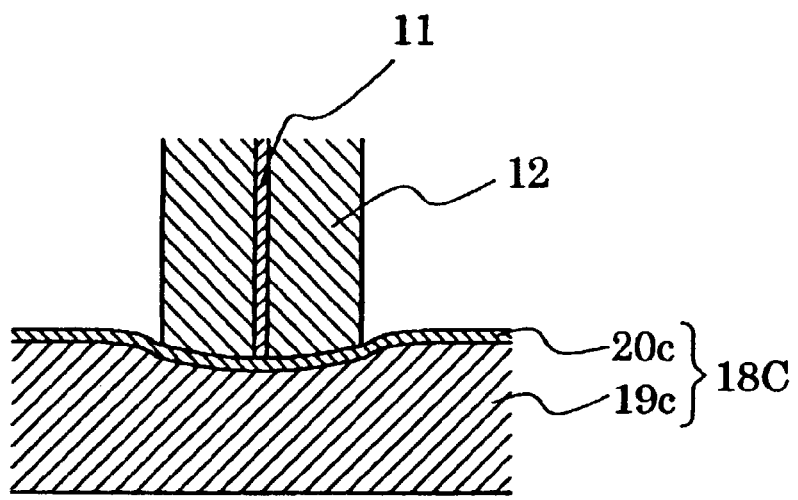
FIG. 4 is a schematically sectional view illustrating a final polishing process of the end face polishing method according to the first embodiment of the invention.

As shown in FIG. 4A, in the final polishing process, at first the elastic member for the intermediate polishing 19b used in the intermediate polishing process is changed for an elastic member for the final polishing 19c of the hardness lower than the elastic member for the intermediate polishing 19b, then, in the same way as in the rough and intermediate polishing processes, the end face of the ferrule 12 is polished while the end face of the ferrule 12 is pressed with the constant load to a surface of an final polishing sheet 20c adhered on the elastic member for the final polishing 19c.

Figure 4B:
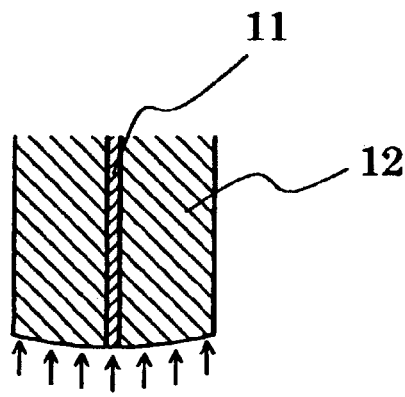
Figure 4C:
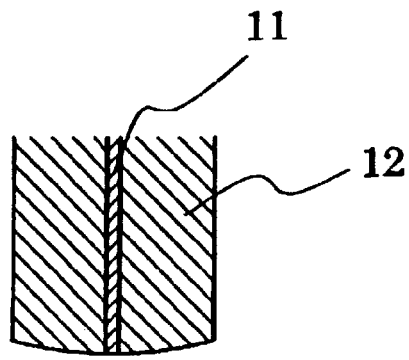

At this point, since in the final polishing process, the polishing is carried out with the constant load by changing the elastic member for the intermediate polishing 19b for the elastic member for the final polishing 19c of the hardness lower than the elastic member for the intermediate polishing 19b, an area where the end face of the ferrule 12 contacts a surface of a final abrasive member 18C is increased compared with the intermediate polishing process. As shown in FIG. 4B, this allows the polishing pressure applied to the end face of the ferrule 12 to be more nearly uniformly dispersed, compared with the intermediate polishing process. Accordingly, as shown in FIG. 4C, the end face of the ferrule 12 including the optical fiber 11 can be final-polished to be smooth.

As described above, according to the end face polishing method of the embodiment, by polishing the end face of the ferrule 12 while each of the abrasive member is changed in the order from that of the higher hardness 18A to that of the lower hardness 18C, the polishing pressure applied to the end face of the ferrule 12 can be gradually and uniformly dispersed to polish smoothly the end face of the ferrule 12.

In the rough abrasive member used for the rough polished process, it is proper that the hardness of the elastic member for the rough polishing be in the range from about 95Hs to about 65Hs, while in the intermediate abrasive member used for the intermediate polishing process, it is good that the hardness of the elastic member for the intermediate polishing be lower than that of the elastic member for the rough polishing, for example, about 55±10Hs. In the final abrasive member used for the final polishing process, it is preferable that the hardness of the elastic member for the final polishing be lower than that of the elastic member for the intermediate polishing, for example, about 45±10Hs.

In the embodiment, there is described the method in which the abrasive member is changed in the order from that of higher hardness to that of lower hardness in each of the rough polishing process, the intermediate polishing process, and the final polishing process. However, the intermediate abrasive member used in the intermediate polishing process after the rough polishing process may be changed for the abrasive member having the hardness lower than the rough abrasive member, and then the final abrasive member used in the final polishing process after the intermediate polishing process may be as hard as the intermediate abrasive member or ±10Hs, or harder than the intermediate abrasive member. In more detail, the elastic member for the intermediate polishing of the intermediate abrasive member, which is used for the intermediate polishing process after the rough polishing, and then the elastic member for the polishing which is as hard as the elastic member for the intermediate polishing or has the hardness of a difference of about ±10Hs from that, or the elastic member for the polishing having the hardness higher than the elastic member for the intermediate polishing is used as the elastic member for the final polishing of the final abrasive member, which is used for the final polishing process. Even if such constitution is adopted, the polishing pressure applied to the end face of the ferrule can be uniformly dispersed to polishing the whole surface of the end face of the ferrule, and almost the same effect as the first embodiment can be obtained.

By uniformly dispersing the polishing pressure applied to the end face of the ferrule 12, generation of the damaged layer in the end face of the optical fiber 11, which is caused by an influence of the abrasive grain on the surface of each of the abrasive sheets 20a to 20b, can be prevented. Accordingly, when the ferrules 12 are oppositely connected, the return loss can be increased.

Examples of the above-described end face polishing method of the invention will be described, however, the invention is not limited to them.

EXAMPLE

In an Example, the hardness of the elastic member for the rough polishing was set to 65 Hs in the rough abrasive member used for the rough polishing process, the hardness of the elastic member for the intermediate polishing was set to 55 Hs in the intermediate abrasive member used for the intermediate polishing process, the hardness of the elastic member for the final polishing was set to 45 Hs in the final abrasive member used for the final polishing process, and the end face of the ferrule including the optical fiber was polished. The load which the end face of the ferrule was pressed against the abrasive sheet on the abrasive member used for each process was set to 2.0N. The silicon oxide ($SiO_2$) was used as the abrasive sheet.

Comparative Example

For purposes of comparison, the end face of the ferrule including the optical fiber was polished by using reverse processes of the Example. The polishing conditions of each polishing process were set to be the same as the Example.

First Test Example

Figure 5A:
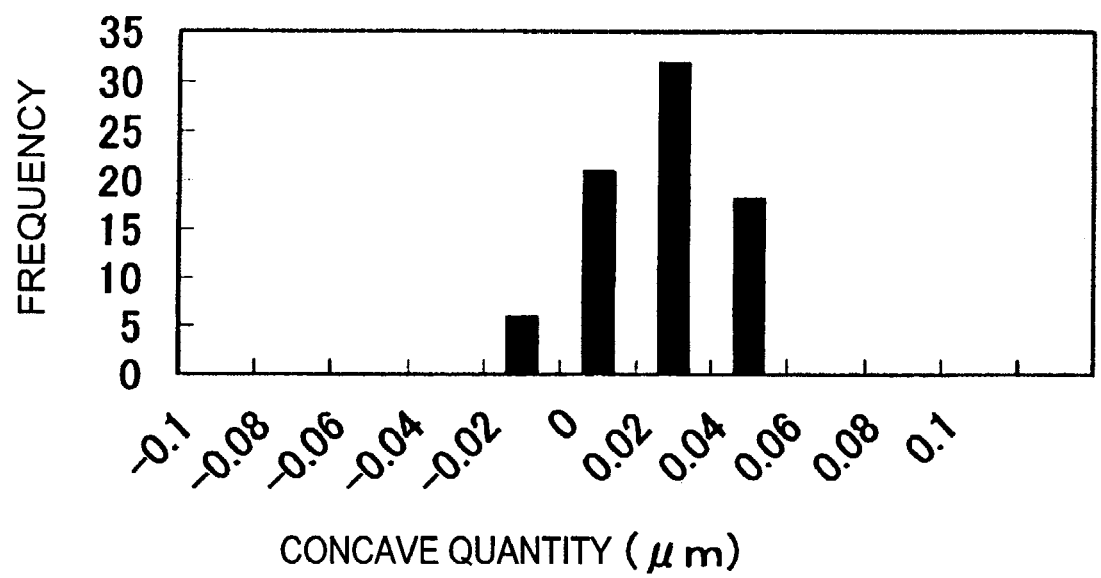
FIG. 5A is an Example.
Figure 5B:
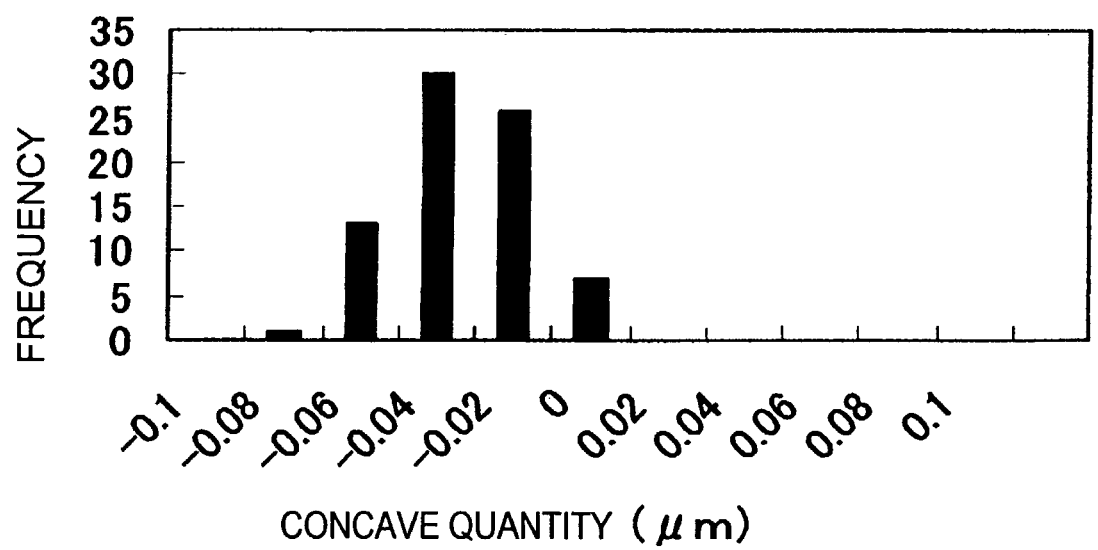
FIG. 5B is a Comparative Example.

The plurality of ferrules which were polished in the Example and the Comparative Example were prepared, the concave quantity ($\mu$m) which the end face of the ferrule was concave in the axis direction was measured with respect to these ferrules of the Example and the Comparative Example. FIG. 5 is a distribution view showing a frequency of each concave quantity, FIG. 5A is the Example, and FIG. 5B is the Comparative Example. In the concave quantity, the quantity which is concave in the axial direction of the optical fiber is indicated by a numerical value with a sign of (-).

Comparing FIG. 5A and FIG. 5B, since the frequency of generation of the concave in the face of the optical fiber is lower in the Example compared with the Comparative Example, it is found that the end face of the optical fiber has been able to be smoothly polished.

Second Test Example

In the same way as the first Test Example, the plurality of ferrules which were polished in the Example and the Comparative Example were prepared, the return loss (dB) in case that the ferrules polished in the Example were oppositely connected and the return loss (dB) in case that the ferrules polished in the Comparative Example were oppositely connected were measured respectively. The result is shown in FIG. 6. FIG. 6 is a distribution view showing a frequency of each return loss, FIG. 6A is the Example, and FIG. 6B is the Comparative Example.

Figure 6A:
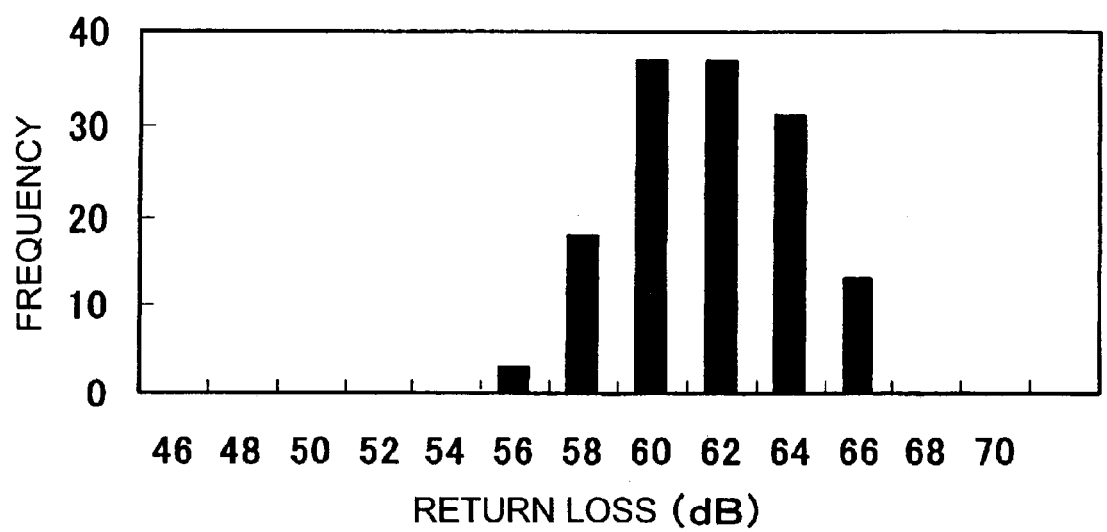
FIG. 6A is an Example.
Figure 6B:
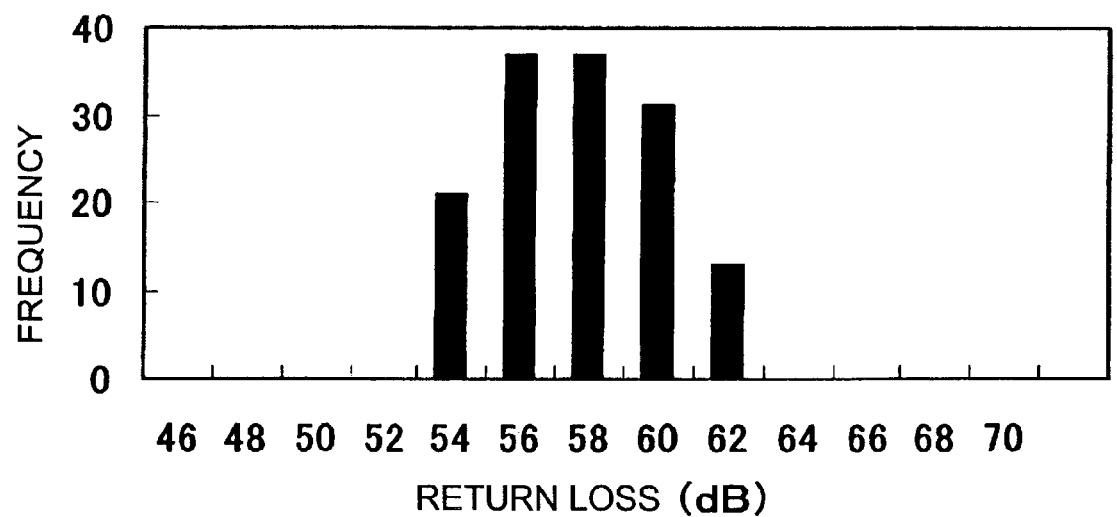
FIG. 6B is a Comparative Example.

Comparing FIG. 6A and FIG. 6B, it was found that the larger return loss in the Example can be obtained compared with the Comparative Example. Particularly, in the case that the ferrules polished in the Example were oppositely connected, the opposite connection can frequently be carried out with the return loss not lower than 60 dB.

(Other Embodiments)

Though the first embodiment of the invention has been described, a basic constitution of the end face polishing method is not limited to the above-described one.

In the first embodiment, the abrasive sheet is adhered to the upper surface of the elastic member, however, it is not limited to this but the elastic member and the abrasive sheet may be integrally formed.

Though the end face of the ferrule including the optical fiber is polished by the abrasive sheet, it is not limited to this and, for example, a polishing liquid in which the abrasive particle polishing the end face of the ferrule and the optical fiber is uniformly dispersed may be applied on the abrasive sheet to polish the end face of the ferrule including the optical fiber by the abrasive particle in the polishing liquid.

In this case, as described above, since the polishing pressure applied to the end face of the ferrule can be uniformly dispersed, the damaged layer in the neighborhood of or near the end face of the optical fiber in the end face of the ferrule, which may be caused by an influence of the abrasive grain in the polishing liquid, is not formed. Accordingly, even if the polishing liquid is intervened or disposed between the end face of the ferrule and the surface of the abrasive sheet, the end face of the ferrule can be smoothly polished by the abrasive particle, and the return loss can be increased when ferrules manufactured according to the present invention are connected so that the polished end faces thereof confront one another.

Furthermore, in the first embodiment, though the polishing of the end face of the ferrule including the optical fiber was described, it is not limited to his but, for example, the end face of the rod-shaped member such as the optical connector holding the ferrule may be polished.

As described above, according to the end face polishing method of the invention, by polishing the end face of the ferrule while the abrasive member is changed in the order from that of higher hardness to that of lower hardness, the polishing pressure applied to the end face of the ferrule can be gradually and uniformly dispersed to polish smoothly the end face of the ferrule, and the return loss in the opposite connection can be increased.

What is claimed is:

1. An end face polishing method for polishing an end face of a rod-shaped member, comprising the steps of:
   providing an end face polishing apparatus having a main body, a jig board mounted on the main body and supporting a rod-shaped member, a polishing board mounted on the main body for undergoing rotational and revolving movements relative to the main body, and a first abrasive member removably mounted on the polishing board for rotational and revolving movements therewith;
   bringing an end face of the rod-shaped member into pressure contact with an abrasive surface of the first abrasive member having a first hardness;
   rotating and revolving the polishing board to polish the end face of the rod-shaped member;
   removing the first abrasive member from the polishing board and removably mounting a second abrasive member on the polishing board for rotational and revolving movements therewith;
   bringing the polished end face of the rod-shaped member into pressure contact with an abrasive surface of the second abrasive member having a second hardness lower than the first hardness; and
   rotating and revolving the polishing board to further polish the end face of the rod-shaped member.

2. A method according to claim 1; further comprising the steps of removing the second abrasive member from the polishing board and mounting a third abrasive member on the polishing board for rotational and revolving movements therewith; bringing the polished end face of the rod-shaped member into pressure contact with an abrasive surface of the third abrasive member having a third hardness lower than the second hardness; and rotating and revolving the polishing board to further polish the end face of the rod-shaped member.

3. A method according to claim 1; wherein each of the bringing steps includes the step of bringing the end face of the rod-shaped member into pressure contact with the abrasive surface of the corresponding one of the first and second abrasive members by applying a constant load on the rod-shaped member while the rod-shaped member is supported at a given position relative to the abrasive surface of the corresponding one of the first and second abrasive members.

4. A method according to claim 1; wherein each of the first abrasive member and the second abrasive member comprises an elastic member for removable connection to the polishing board and an abrasive sheet having the abrasive surface and disposed on a surface of the elastic member.

5. A method according to claim 1; wherein the rod-shaped member comprises a ferrule supporting an optical fiber.

6. A method according to claim 1; wherein the rod-shaped member comprises an optical connector having a ferrule supporting an optical fiber.

7. An end face polishing method, comprising the steps of:
providing an end face polishing apparatus having a main body, a jig board mounted on the main body and supporting at least one workpiece, a polishing board mounted on the main body for undergoing rotational and revolving movements relative to the main body, and a plurality of abrasive members each removably connectable to the polishing board for rotational and revolving movements therewith, each of the abrasive members having an abrasive surface with a hardness that is either higher or lower than the hardness of the abrasive surface of the others of the abrasive members; and
successively bringing an end face of the workpiece into pressure contact with the abrasive surface of each of the abrasive members in descending order of hardness of the abrasive surfaces while rotating and revolving the polishing board to thereby successively polish the end face of the workpiece.

8. An end face polishing method according to claim 7; wherein the workpiece comprises a rod-shaped member.

9. An end face polishing method according to claim 7; wherein the workpiece comprises a ferrule supporting an optical fiber.

10. An end face polishing method according to claim 7; wherein each of the abrasive members comprises an elastic member for removable connection to the polishing board, and an abrasive sheet having the abrasive surface and mounted on a surface of the elastic member.

11. An end face polishing method according to claim 7; wherein the plurality of abrasive members comprise a first abrasive member having the abrasive surface with a first hardness, a second abrasive member having the abrasive surface with a second hardness lower than the first hardness, and a third abrasive member having the abrasive surface with a third hardness lower than the second hardness.

12. An end face polishing method according to claim 7; wherein the bringing step includes the step of pressing the end face of the workpiece against the abrasive surface of each of abrasive members with a constant load.

13. An end face polishing method, comprising the steps of:
bringing and maintaining an end face of a workpiece into pressure contact with an abrasive surface of a first abrasive member having a first hardness while rotating and revolving the first abrasive member to thereby polish the end face of the workpiece;
thereafter bringing and maintaining the end face of the workpiece into pressure contact with an abrasive surface of a second abrasive member having a second hardness lower than the first hardness while rotating and revolving the second abrasive member to thereby further polish the end face of the workpiece; and
thereafter bringing and maintaining the end face of the workpiece into pressure contact with an abrasive surface of a third abrasive member having a third hardness lower than the second hardness while rotating and revolving the second abrasive member to thereby further polish the end face of the workpiece.

14. An end face polishing method according to claim 13; wherein the workpiece comprises a rod-shaped member.

15. An end face polishing method according to claim 13; wherein the workpiece comprises a ferrule supporting an optical fiber.

16. An end face polishing method according to claim 13; wherein each of the first, second and third abrasive members comprises an elastic member and an abrasive sheet disposed on the elastic member and having the abrasive surface with which the end face of the workpiece is brought into pressure contact.

17. An end face polishing method according to claim 13; wherein each of the bringing and maintaining steps includes the step of pressing the end face of the workpiece against the abrasive surface of each of the first, second and third abrasive members with a constant load.

18. An end face polishing method according to claim 13; wherein the first abrasive member has a hardness Hs in the range of 65 to 95, the second abrasive member has a hardness Hs in the range of 55±10, and the third abrasive member has a hardness Hs in the range of 45±10.

19. An end face polishing method according to claim 13; wherein the first abrasive member has a hardness Hs of about 65, the second abrasive member has a hardness Hs in the range of about 55, and the third abrasive member has a hardness Hs in the range of about 45.

20. An end face polishing method according to claim 13; wherein each of the first, second and third abrasive members comprises an elastic member having the abrasive surface with which the end face of the workpiece is brought into pressure contact.

* * * * *